United States Patent [19]

Matsui

[11] Patent Number: 5,642,696

[45] Date of Patent: Jul. 1, 1997

[54] ENGINE STARTING SYSTEM FOR MOTOR VEHICLE

[75] Inventor: Fujio Matsui, Sagamihara, Japan

[73] Assignee: Fuji Jukogyo Kabushiki Kaisha, Tokyo, Japan

[21] Appl. No.: 575,615

[22] Filed: Dec. 20, 1995

[30] Foreign Application Priority Data

Jan. 17, 1995 [JP] Japan ................. 7-005231

[51] Int. Cl.$^6$ ............................................. F02N 11/08
[52] U.S. Cl. ..................... 123/179.1; 123/179.3; 290/38 R
[58] Field of Search ................ 123/179.1, 179.3; 290/38 R, 50

[56] References Cited

U.S. PATENT DOCUMENTS

| | | | |
|---|---|---|---|
| 5,146,095 | 9/1992 | Tsuchiya et al. | 290/38 R |
| 5,207,194 | 5/1993 | Clerici | 123/179.1 |

FOREIGN PATENT DOCUMENTS

| | | | |
|---|---|---|---|
| 1193287 | 11/1985 | U.S.S.R. | 290/38 R |
| 1776865 | 11/1992 | U.S.S.R. | 290/38 R |

OTHER PUBLICATIONS

SU 1590617 (Kopylov et al), Sep. 7, 1990, abstract—Derwent Information LTD, 1996.

*Primary Examiner*—Andrew M. Dolinar
*Attorney, Agent, or Firm*—Beveridge, DeGrandi, Weilacher & Young, L.L.P.

[57] ABSTRACT

An engine starting system for a vehicle includes a starter, a lead battery, an electric double layer capacitor which is connected in parallel with the lead battery, a starter switch and a control circuit for controlling current to the starter. The electric double layer capacitor is charged by the lead battery and discharge a large current to the starter when an engine is started. According to the construction of the control circuit, it is possible to control current discharged from the electric double layer capacitor so as to reduce damages on switches in the engine starting system. By using the electric double layer capacitor for the engine starting system, not only the burden on the lead battery at the engine starting can be reduced, but also the startingability of the engine can be improved.

14 Claims, 9 Drawing Sheets

5,642,696

ENGINE STARTING SYSTEM FOR MOTOR VEHICLE

BACKGROUND OF THE INVENTION

1. Field of the Invention

The present invention relates to an engine starting system for a motor vehicle and particularly to an engine starting system capable of supplying large current to a starter without burdening s battery with electrical loads when an engine is started.

2. Prior Art

FIG. 1 shows a construction of a representative engine starting system using a starter. Generally, in the engine starting system, the torque generated in the starter rotates a crank shaft through a pinion for starting the engine.

The starter assembly 10 comprises a magnet section 12 and a starter 14. A battery 16 is connected with a solenoid coil 22 of the magnet section 12 through a fusible link 18 and a starter switch 20. Further, the battery 16 is connected with a terminal 24a of a main switch 24 for supplying current to the starter 14. The starter 14 is a series-wound direct current type motor comprising a pinion 26 disposed on a thrust shaft of an armature 32, an exciting coil 28, an armature coil 30 and a commutator 34.

When the starter switch 20 is turned on, current is supplied from the battery 16 to the solenoid coil 22 and the plunger 36 is shifted in the direction indicated by an arrow 100 to turn the main switch 24 of the magnet section 12 on. Thus, current from the battery 16 is supplied to the starter 14 through a main line 200. At this moment, a shift fork 38 is rotated to move the pinion 26 in the direction indicated by an arrow 300, thereby the pinion 26 is meshed with a ring gear 40. Thus, the torque of the starter 14 is transferred to the ring gear 40 to rotate the crank shaft for starting the engine.

FIG. 2 presents miscellaneous characteristics of the starter 14 with respect to the current flowing therethrough. In this drawing, a curve (a) indicates output characteristic, a curve (b) does rotational speed characteristics, a curve (c) does torque characteristics and a curve (d) does voltage characteristics. For example, when the rotational speed of the starter 14 is zero, both current and torque become maximum. Torque is reduced with an increase of the rotational speed. Torque is proportional to the square of current. In a row current area the square characteristic is outstanding and in a high current area the increase rate of torque becomes constant due to the saturation of lines of magnetic flux.

In order for the starter to produce an output as shown in the specification, the output characteristics of the battery must be larger than that of the starter, that is to say, the curve (e) must always stay above the curve (d).

FIG. 3 shows a change of the starter current Id in the process from the standstill state to the starting state of the engine. The change of the starter current Id is composed of three components, namely, first one is a lock area current component (hereinafter referred to as lock current) 50, second one is an alternating current component 52 in which current pulsates according to the reciprocating motion of the piston and third one is a direct current component which corresponds to friction of the mechanical parts of the engine. Here, the lock current area means a period from when the engine is initially rotated by the starter until when it reaches a rotational number enabling to start the engine.

The direct current component comprises a current component 54 corresponding to static friction to be overcome at the initial rotation of the engine and a current component 56 corresponding to dynamical frictions caused during the rotation of the engine. When the engine is cold, a larger current component corresponding to an increased static friction is added. In FIG. 3, the period from the engine stop to the engine starting is called a lock current area time 70 including a period 58 from the engine stop to the engagement of the pinion with the ring gear and a period 60 of the current mainly corresponding to static frictions.

The discharge characteristic of the battery is lowered due to the life of the battery, cold temperature conditions and the like. In an extreme case, the battery discharge characteristic becomes lower than the voltage characteristics of the starter. As shown in FIG. 3, in order to overcome frictions and rotate the crank shaft, the magnitude of the lock current 50 must be larger than a value determined by the capacity of the battery and the resistance of the starter. Followings are conditions which are generally required in designing the battery and starter system.

(1) The battery capacity capable of supplying a lock current enough to overcome the static frictions at starting the engine.

(2) The life of the battery is affected especially by deep discharge conditions encountered each time of the engine starting.

(3) A voltage drop caused by wiring resistance must be taken into consideration when the lock current is supplied. For reducing the voltage drop, a large diameter of wiring is needed.

For example, Japanese Unexamined Patent Application Toku-Kai-Hei 2-175350, Unexamined Utility Model Application Jitsu-Kai-Hei 3-82876 and others disclose techniques to solve these problems. However, these prior arts are still insufficient to solve the problems associated with the lock current.

SUMMARY OF THE INVENTION

Accordingly, the present invention is intended to obviate the aforementioned disadvantages of the prior arts and the objects of the present invention will be summarized as follows.

It is an object of the present invention to provide vehicular engine starting system which can reduce burdens on the battery when a lack current is supplied to the starter.

It is another object of the present invention to provide a vehicular engine starting system by which the startingability of the engine can be largely improved.

In order to achieve these objects, the engine starting system for a vehicle having an engine, a starter for starting the engine, a battery for supplying a current to the starter, a main electrical pass for electrically connecting the battery with the starter, a main switch for selectively opening and closing the main electrical pass and a key switch for operating the main switch, comprises:

an electrical connection line for electrically connecting the main electrical pass with ground; and a capacitor interposed on the electrical connection line for storing electricity when the main switch is opened and for supplying a lock current to the starter when the main switch is closed;

switching means interposed between the capacitor and the main electrical pass for closing the electrical connection line when the key switch is closed and for opening the electrical connection line when the key switch is opened;

an electrical connection line connected in parallel with the switching means; and a regulating resistor interposed on the electrical connection line for regulating current.

BRIEF DESCRIPTION OF THE DRAWINGS

A specific embodiment of the present invention will be described with reference to the accompanying drawings, in which.

DETAILED DESCRIPTION OF PREFERRED EMBODIMENTS

Figure 4:
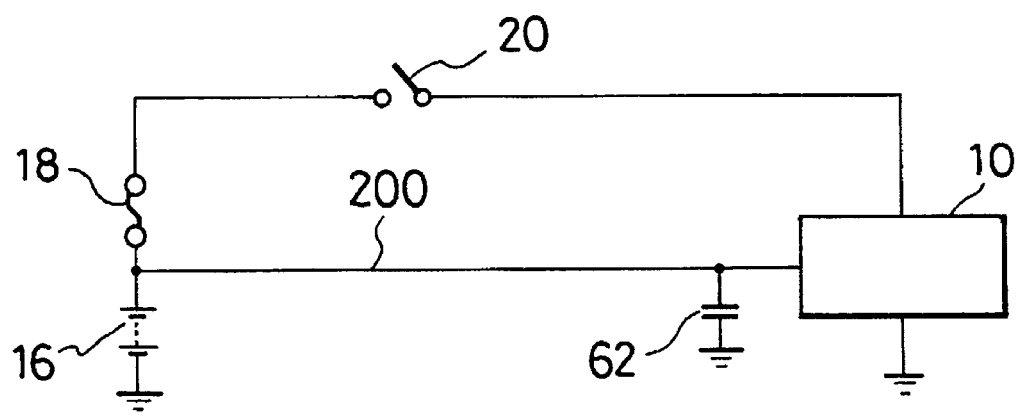
FIG. 4 is a view showing a construction of a 1st embodiment according to the present invention.

FIG. 4 is a schematic diagram showing a basic construction of a first embodiment according to the present invention. In this diagram, the connection of the starter assembly 10 with the lead battery 16 is the same as that of the prior art shown in FIG. 1. In this embodiment, additionally an electric double layer capacitor 62 is connected in parallel with the lead battery 16 across the main connection line 200, The connecting point of the capacitor 62 should be located at a possible nearest position to the starter assembly 10 in consideration of the resistance of wirings. The main connection line 200 is connected with the contact point 24a (refer to FIG. 1) of the main switch 24.

Figure 1:
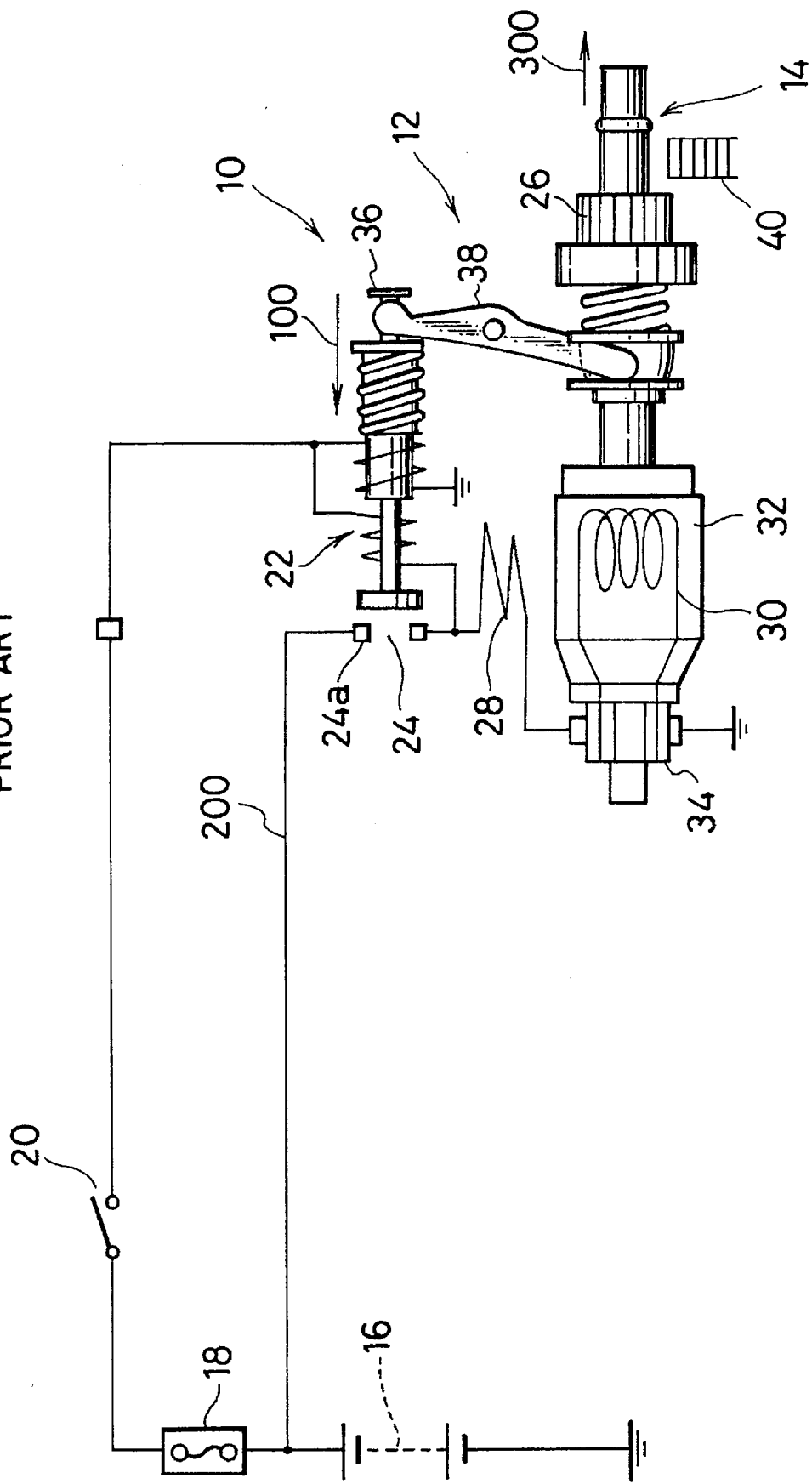
FIG. 1 is a schematic view showing a starter system generally used.
Figure 2:
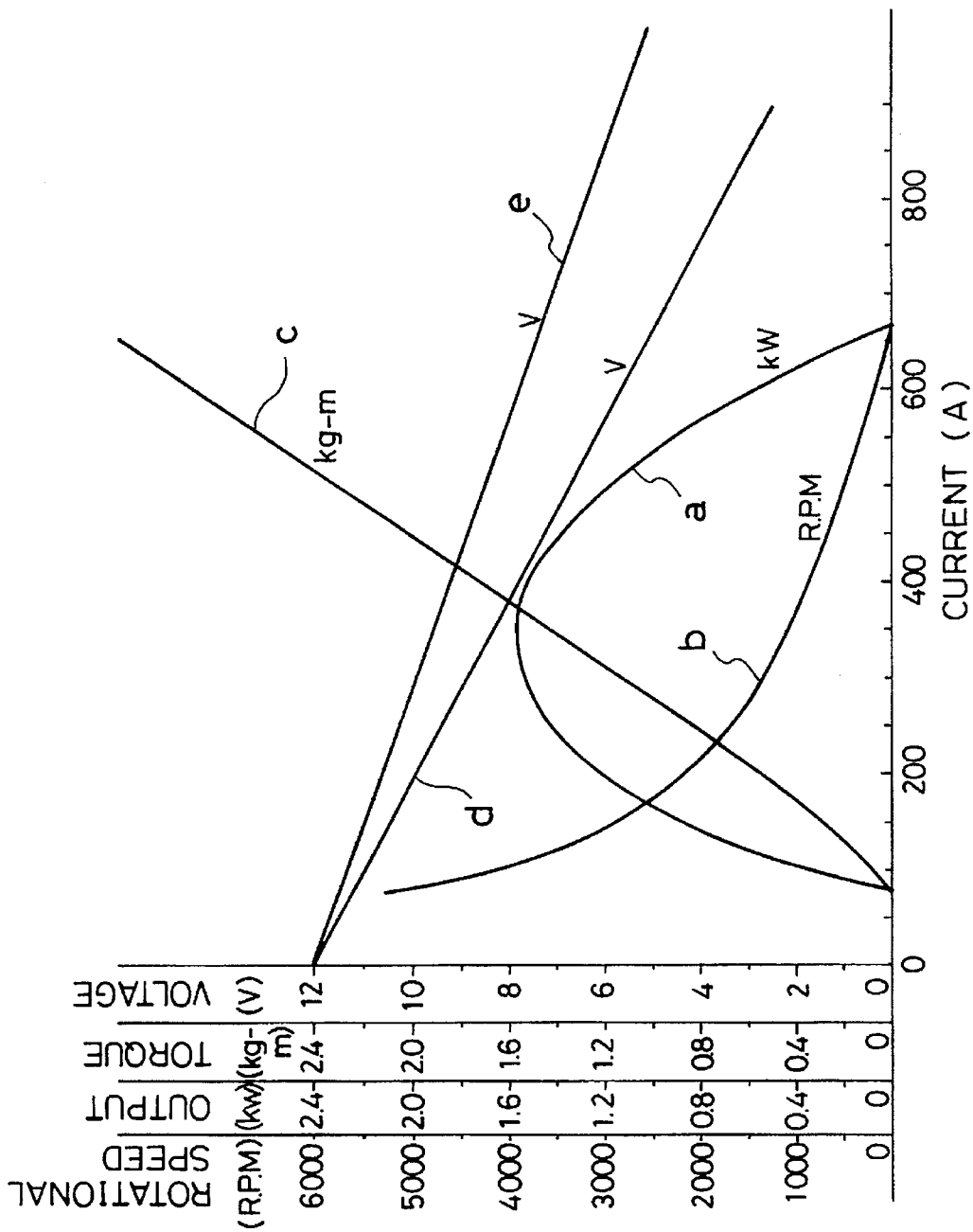
FIG. 2 is a diagram showing electrical characteristics of a starter.
Figure 3:
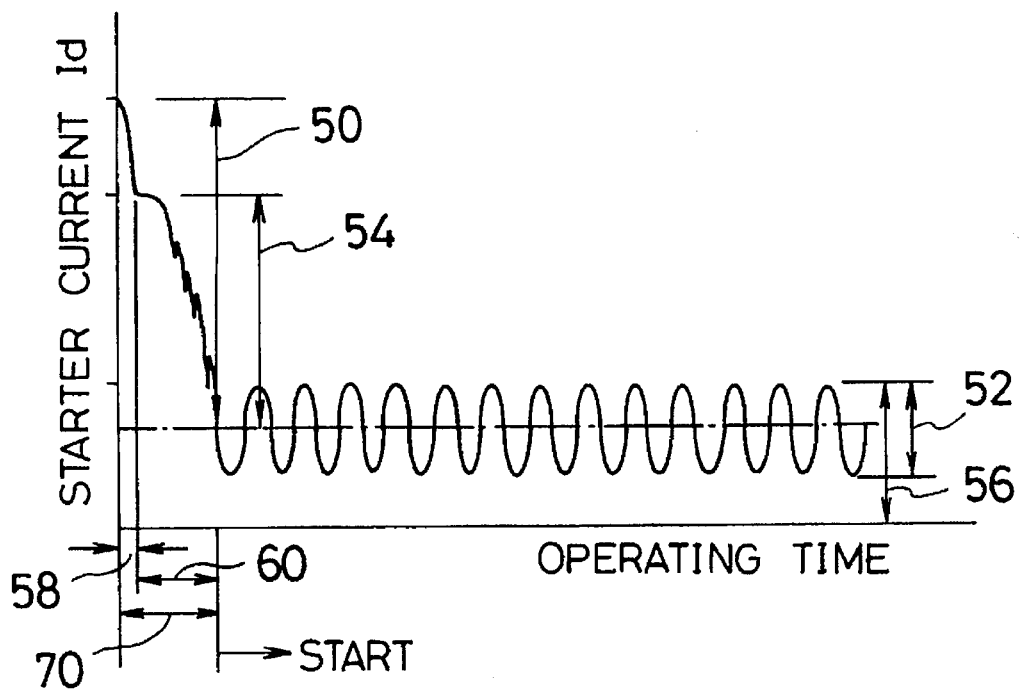
FIG. 3 is a diagram showing a characteristic of current flowing through a starter.

When the starter switch 20 is turned on, as described in FIG. 1, the main switch 24 of the starter 14 is turned on by the operation of the magnet section 12, thereby a starter current as shown in FIG. 3 flows and a lock current is fed to the starter 14 from the lead battery 16 and the electric double layer capacitor 62. Since the power density per weight of the capacitor 62 is conspicuously large and further the internal resistance thereof is small compared to those of the lead battery 16, the lock current is supplied mostly from the electric double layer capacitor 62.

Figure 11:
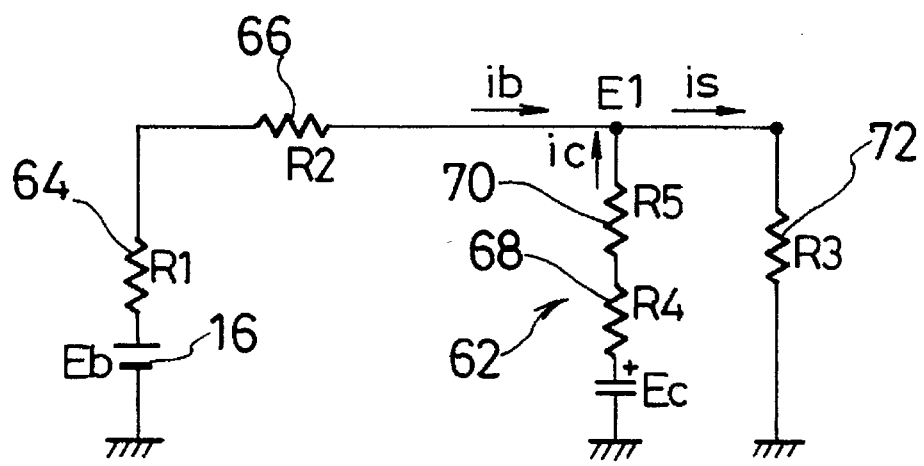
FIG. 11 is a diagram showing an equivalent circuit of the retay control circuit presented in FIG. 8.

FIG. 11 shows an example of the equivalent circuit of the first embodiment presented in FIG. 4, in which Eb denotes a discharge voltage of the lead battery 16, R1 does an internel resistance thereof, R2 does a resistance of the connection line between the battery and the starter, Ec does a voltage of the electric double Layer capacitor 62, R4 does an internal resistance thereof and R5 does a wiring resistance 70. The internal resistance 72 of the starter assembly 10 is approximated to as R3. Further, the internal resistance of the lead battery 16 is inversely proportional to the capacity of the battery.

Figure 12:
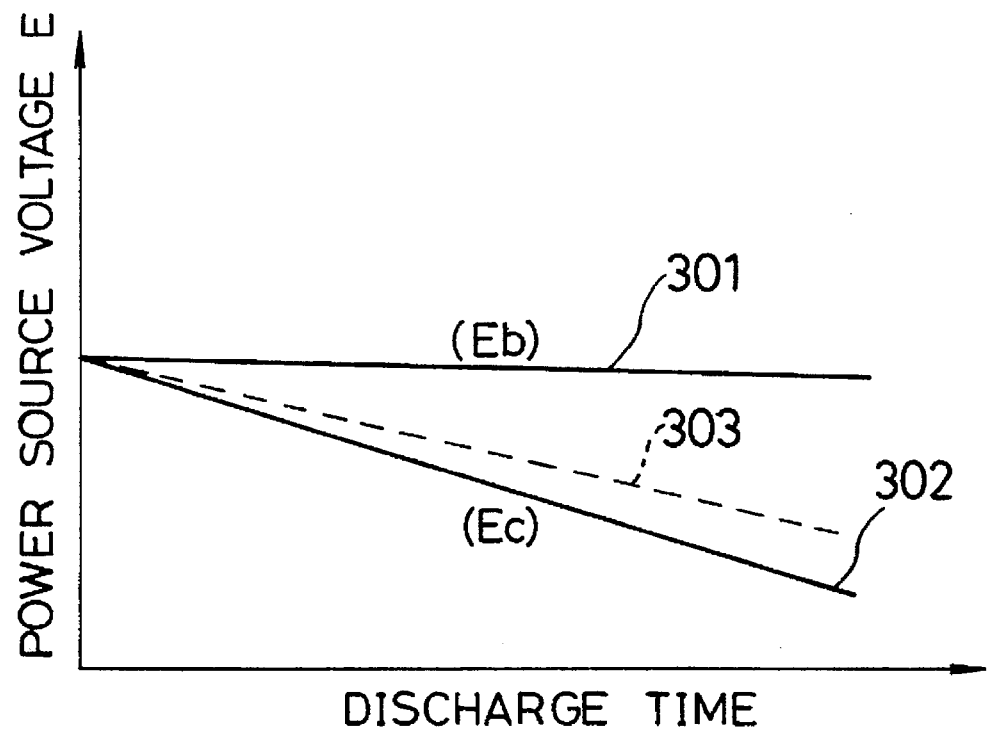
FIG. 12 is a diagram showing output voltage characteristics for a lead battery and for an electrical double layer capacitor respectively.

As illustrated in FIG. 12, the discharge voltage Eb of the lead battery 16 is roughly constant as shown by a line 301 if the load resistance is constant and the discharge time is short and the voltage Ec of the electric double layer capacitor 62 goes down in proportion to time as shown by a line 302. In the lock current area, the impedance of the power source viewed from the starter assembly 10 is in the relationship R4+R5<R1+R2, while R4+R5 being connected in parallel with R1+R2.

The current ib supplied from the lead battery 16 is expressed as ib=Eb/(R1+R2+R3) and the current ic supplied from the electric double Layer capacitor 62 is expressed as ic=Ec/(R4+R5+R3), thus the starter current is being formed as is=ib+ic.

Consequently, the lock current is supplied mainly from the electric double layer capacitor 62. The burden of the lead battery 16 can be reduced relatively by increasing the internal resistance R1, namely using a battery with a small capacity, or by increasing the wiring resistance R2 or by using an electric double layer capacitor 62 with a large capacity. Further, the burden of the battery 16 can be lessened also by decreasing the internal resistance of the electric double layer capacitor 62.

When the battery 16 is not fully charged, or when the discharge performance is degraded due to the aged deterioration, the discharge performance of the lead battery 16 is lowered like a line 303 shown in FIG. 12, then an apparent internal resistance of the battery is increased and as a result the burden of the electric double layer capacitor 62 becomes large, Therefore, even when the battery 16 is in the deep discharging condition or when the discharge performance is in the degraded condition, the stable engine starting can be secured.

Further, according to the embodiment shown in FIG. 4, since the electric double layer capacitor 62 is disposed at the possible nearest position to the starter assembly 10, a diameter of the wiring harness of the connecting line 200 between the lead battery 16 and the electric double layer capacitor 62 can be reduced.

When the starter switch 20 is turned off, the main switch 24 of the starter 14 is released and the electric double layer capacitor 62 is charged by the current supply from the lead battery 16.

Figure 5:
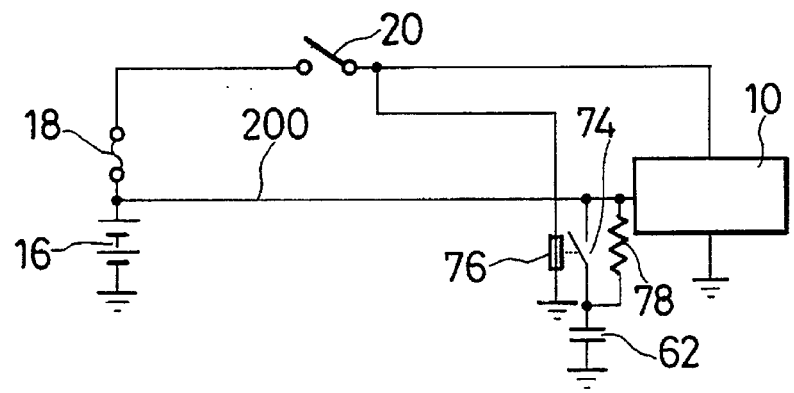
FIG. 5 is a view showing a construction of a 2nd embodiment according to the present invention.

Referring to FIG. 5, a second embodiment according to the present invention, an improvement of the first embodiment as shown in FIG. 4, will be described below.

When the starter switch 20 is turned off, in a case where the internal resistance of the electric double layer capacitor 62 is smaller than that of the starter assembly 10, large current flows into the capacitor 62 from the lead battery 16. This brings not only a burden on the lead battery 16 but also an abrupt increase of the engine output, because the generator of the engine attempts to generate more power so as to compensate the consumed power. This abrupt increase of the engine output results in an increase of emissions and an adverse effect on fuel economy.

According to the second embodiment, a relay switch 74 is connected in series between the electric double layer capacitor 62 and the main connection line 200. The relay switch 74 is turned on by the relay coil 76 which is energized when the starter switch 20 is turned on.

On the other hand, when the starter switch 20 is turned off, the relay coil 76 is deenergized and the relay switch 74 is turned off.

Further, a resistor 78 is connected in parallel with the relay switch 74. When the starter switch 20 is turned on, the relay switch 74 is turned on and the due amount of lock current is supplied from the electric double layer capacitor 62 to the starter assembly 10. On the other hand, when the starter switch 20 is turned off, the relay switch 74 is turned off to start charging the electric double layer capacitor 62 by the lead battery 16. Since the charging is performed through the resistor 78, large current never flows into the capacitor 62 and therefore an abrupt charging therein can be avoided. In this embodiment, the value of the resistor 78 is determined such that the current flowing therethrough is lower than the lock current.

Figure 6:
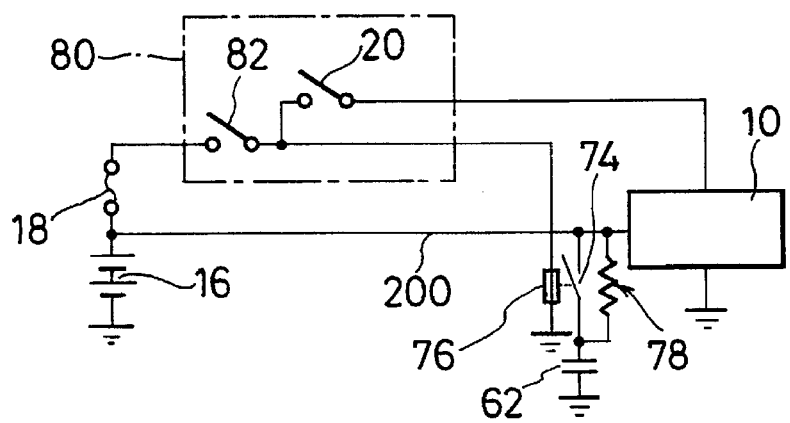
FIG. 6 is a view showing a construction of a 3rd embodiment according to the present invention.

FIG. 6 shows a basic construction of a circuit according to a third embodiment, in which a key switch 80 is added to the second embodiment. The key switch 80 has a multistage construction comprising an ignition switch 82 for a first stage and a starter switch 20 for a second stage. That is to say, when the key switch 80 is turned on, first the ignition key switch 82 is energized and after that the starter switch 20 is energized.

In the second embodiment, when the starter switch 20 is turned on, the relay coil 76 is energized and at the same time the relay switch 74 is turned on. Then, high current is fed to the starter assembly 10 from the electric double layer capacitor 62. This high current produces arcs at the contact point of the relay switch 74 and because of this the contact point is damaged. The damage of the contact point incurs not only deterioration of the relay switch 74 but also an increase of the contact resistance of the contact point, thereby the starting performance of the starter is adversely affected.

In the third embodiment thus constituted, since the starter switch 20 is turned on after the ignition key switch 82 is turned on and the relay switch 74 is closed, high current is supplied to the starter assembly 10 from the electric double layer capacitor 62 without generating arcs at the contact point of the relay switch 76. That is, the third embodiment saves the relay switch 74 from damages and provides with a longer life.

Figure 7:
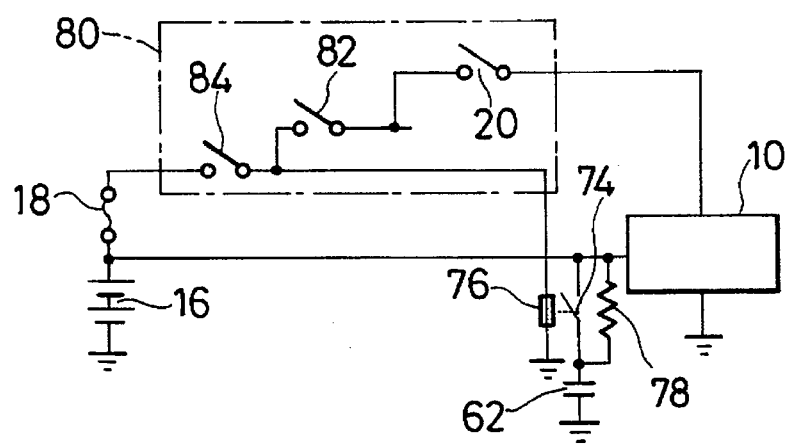
FIG. 7 is a view showing a construction of a 4th embodiment according to the present invention.

FIG. 7 presents a fourth embodiment according to the present invention, The fourth embodiment has a similar function as the third embodiment described above. It is characterized in the key switch 80 which is operated in three stages. An accessory switch 84 is added to the key switch 80 of the third embodiment, That is, in the two stage switch of FIG. 6, when the switching operation from the ignition key switch 82 to the starter switch 20 is swiftly performed, it may happen that the relay switch 74 is closed to allow a discharge of high current from the electric double layer capacitor 62 immediately after the starter switch 20 is turned on, To avoid such a situation, the accessory switch 84 acts as delaying an operation of the starter switch 20.

Next, several embodiments for restricting the discharge of the electric double layer capacitor 62 within the lock current area will be described.

When the electric double layer capacitor 62 continues to discharge current after the lock current area, the output voltage of the capacitor 62 goes down and becomes below Eb as shown in FIG. 12. Then, current flows back into the capacitor 62 from the lead battery 16 and the burden of the lead battery 16 is increased so much. Particularly, in a case where the relay switch 74 is controlled by the accessory switch 84, the relay switch 74 is still closed even with the starter switch 20 turned off. This leads to an increase of burden on the electric double layer capacitor 62. Therefore, it is desirable to restrict the burden of current of the capacitor 62 to the lock current area as far as possible.

Figure 8:
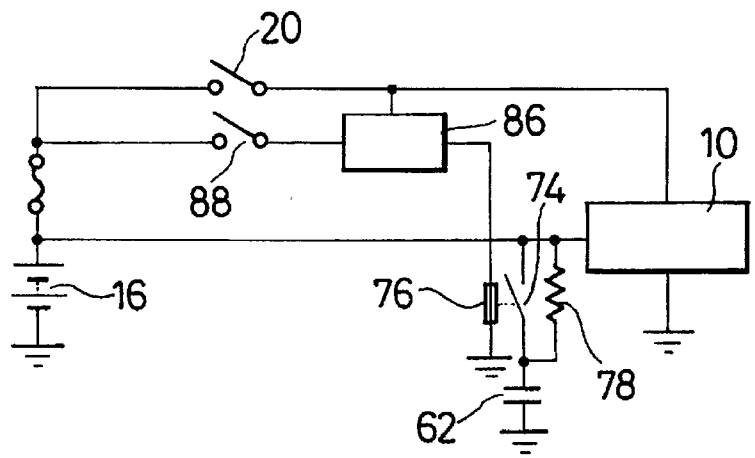
FIG. 8 is a view showing a construction of a 5th embodiment according to the present invention.

Referring to FIG. 8, the engine starting system of this embodiment includes a relay control circuit 86 for controlling the current flowing through the relay coil 76 of the relay switch 74 to turn the relay switch 74 off during the discharge from the electric double layer capacitor 62.

When a switch 88 equivalent to the ignition switch or the accessory switch is turned on, the relay control circuit 86 is operated so as to energize the relay coil 76. Then, the relay switch 74 is turned on and the electric double layer capacitor 62 is connected with the starter assembly 10. When the starter switch is turned on, current is discharged from the capacitor 62 to the starter assembly 10 without damaging the relay switch 74.

After a specified time elapses since the starter switch 20 is turned on, or when the engine speed reaches a specified value, the relay control circuit 86 is operated so as to deenergize the relay coil 76 for turning the relay switch 74 off. Thereby, the discharge from the electric double layer capacitor 62 is stopped and the capacitor 62 is started to be charged from the lead battery 16 through the resistance 78 connected in parallel with the relay switch 74.

Figure 9:
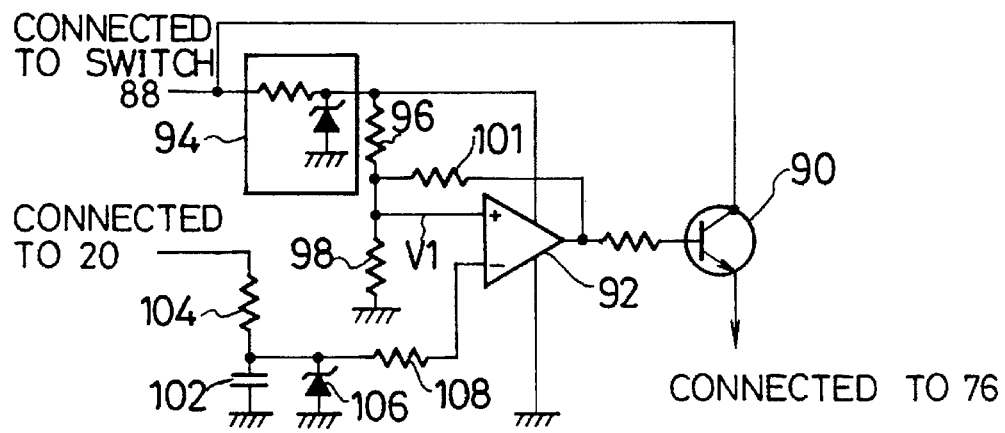
FIG. 9 is a diagram showing a relay control circuit according to the 5th embodiment presented in FIG. 8.

FIG. 9 presents an example of the embodiment of the aforementioned relay control circuit 86, in which the relay switch is turned off a specified time Later after the starter switch 20 is turned on.

A transistor 90 for switching the current to the relay coil 76 on or off is connected at the collector side thereof with the switch 88, at the emitter side thereof with the relay coil 76 and at the base side thereof with an output line of an operational amplifier 92. The transistor 92 is energized when the output from the operational amplifier 92 is at the high level and deenergized when it is at the low level.

On the non-inverting input terminal side of the operational amplifier 92, a resistance 96 for regulating the voltage supplied from the connection line of the switch 88, deviding resistances 94 and 98 for generating a comparison voltage V1 to compare with the inverting side voltage are connected respectively. Further a resistance 101 is connected on the intermediate line between the deviding resistances 96, 98 and the output line of the operational amplifier 92. Thus, a hysteresis circuit is constituted for the purpose of keeping the output of the operational amplifier 92 at the low level when the operation of the operational amplifier 92 becomes the low level and the transistor 90 is deenergized.

On the inverting input terminal of the operational amplifier 92, a capacitor 102 and a resistance 104 are connected in parallel and an end of the resistance 104 is connected with the starter switch 20. Further, when the starter switch 20 is turned on, the capacitor 102 is charged and the voltage thereof rises. The voltage biases the inverting input terminal of the operational amplifier 92 through a resistance 108 while the output of the capacitor 102 is controlled so as not to exceed the circuit power source by use of a Zener diode 106.

Since the voltage of the inverting input terminal is lower than that of the non-inverting input terminal immediately after the starter switch 20 is turned on, the output of the operational amplifier 92 is at the high level and consequently the transistor 90 is continued to be energized to keep the relay switch 74 closed.

Further, the cranking being continued and the voltage of the inverting input terminal exceeding that of the non-inverting input terminal, that is, a specified time elapsing, the output of the operational amplifier 92 becomes the low level and the transistor 90 is deenergized. Whereby the relay switch 74 is turned off.

Thus, the discharge is performed from the electric double layer capacitor 62 for the specified time which is determined by the time constant circuit composed of the capacitor 102 and the resistance 104. After the specified time elapses, the discharge is forcedly stopped by shutting off the relay switch 74 even while the discharge is continued. Consequently even when the starter switch is at the closing condition, since the discharge from the capacitor 62 is terminated after a necessary lock current is fed, it is possible to use the electric double layer capacitor 62 efficiently with a minimum capacity and furthermore it is possible to reduce the burden of the lead battery 16.

Figure 10:
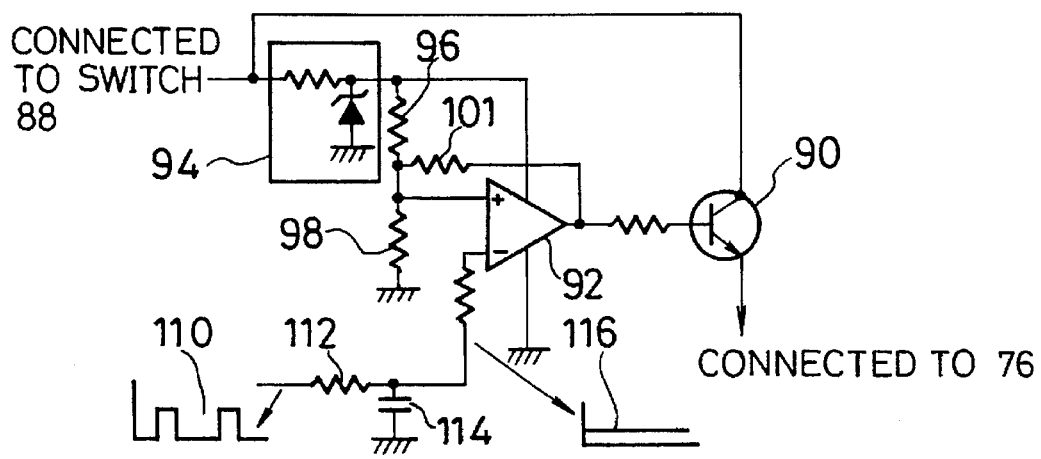
FIG. 10 is a diagram showing a variation of the relay control circuit presented in FIG. 9.

FIG. 10 shows a circuit of the embodiment in which the relay switch 74 is controlled by engine speed.

Generally, it is impossible to determine the duration time of the lock current discretionally because it is affected by ambient temperature, battery electrolyte temperature, engine frictions, battery discharge characteristics, starter characteristics and the like. Further, a greater part of the lock current is finished to be fed during the period from engine standstill to cranking start. An object of this embodiment is to employ the rotational movement of the engine as a signal for stopping the lock current.

The difference of this embodiment from the circuit shown in FIG. 9 lies in an input signal to the inverting input terminal of the operational amplifier 92. In place of the signal from the starter switch 20, engine pulse signals 110 are used. The engine pulse signals 110 are inputted to an integral circuit comprising a capacitor 114 and a resistance 112. When the engine speed becomes high, the voltage of the inverting input terminal is smoothed as illustrated at numeral 116 and is biased on the operational amplifier 92.

When the engine speed does not reach a predetermined value, the output of the operational amplifier 92 is at the high level and therefore the relay switch is in an energized condition. When engine speed reaches the predetermined value, the voltage of the inverting input terminal becomes higher than that of the non-inverting input terminal, thereby the relay switch 74 is turned off.

The judgement of whether or not engine speed reaches the predetermined value is performed by detecting an engine revolution, for example, detecting a revolutional movement of the crank shaft. It is possible to establish a time constant of the integral circuit such that the relay switch 74 can be turned off with at least one revolution of the crank shaft.

Since the circuits shown in FIG. 5 and FIG. 8 have functions as mentioned above, the relay switch 74 can be turned off forcedly even during a discharge of the electric double layer capacitor 62. Hence, it is desirable to protect the contact point by sizing up the contact point, enlarging the gap of the contact point, operating the contact point in a vacuum condition or in inert gas, or operating the contact point at high speed, however any of these countermeasures incurs an up-sizing of the relay switch, an increase of weight, an increase of volume and an increase of manufacturing cost.

Hence, the following embodiment is based on the consideration that the relay switch should not be shut off as far as possible while the discharge current flows to the starter assembly 10.

That is to say, the construction according to this embodiment is constituted in such a way that the relay switch is shut off when it is detected that the discharge current from the electric double layer capacitor 62 becomes small or ceases to flow, whereby not only the lock current can be avoided from being stopped half way but also enabling a miniaturization of the relay switch. The relay switch according to this embodiment has a small switch capacity meeting only the heating condition based on the wiring resistance and the contact resistance of the contact point. For example, it is possible to employ as small a switch as one-severalth or less of the rated capacity. Further, practically it becomes easy to obtain a switch having a sufficient endurance even when used for large current apparatuses such as starters.

As mentioned before, the circuit shown in FIG. 8 is equivalent to the model circuit of FIG. 11 and discharge characteristics of the lead battery 16 and the electric double layer capacitor 62 are like in FIG. 12. When current is fed to a load, that is, the starter, the voltage drop of the lead battery 16 is not so large as shown by a line 302 but the voltage of the capacitor 62 goes down in proportion to the discharged charge amount.

Figure 13:
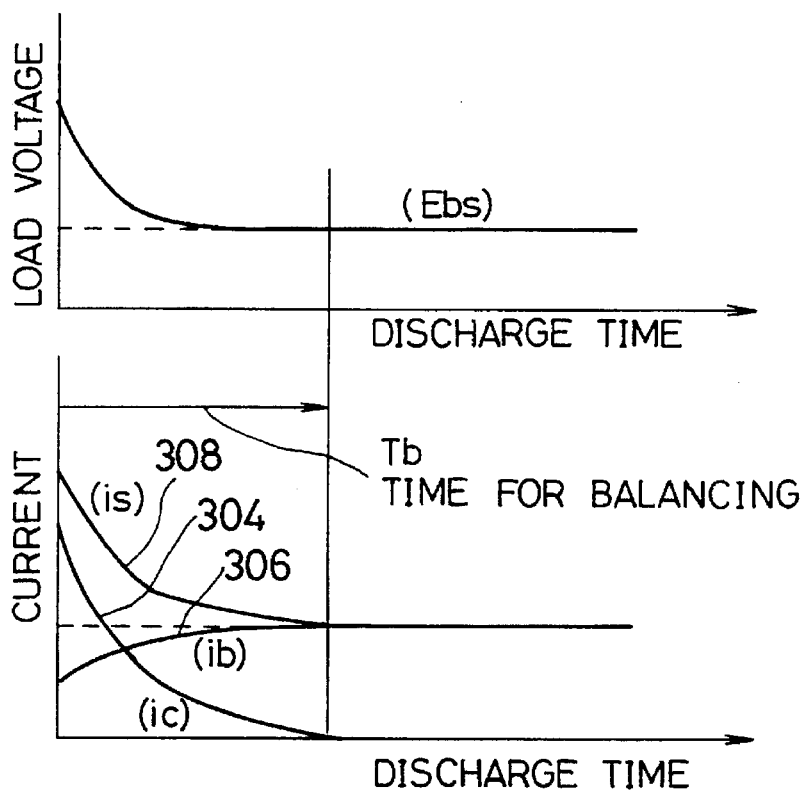
FIG. 13 is a diagram showing characteristics of an applied voltage and a supplied current to a starter.

As far as the load does not generate the counter electromotive force and the amount of the load does not change so much, the biasing voltage is like a line (A) shown in FIG. 13. That is, a final voltage Ebs of the starter assembly 10 is expressed as Ebs=Eb.R3/(R1+R2+R3) and the current 304 (refer to B of FIG. 13) of the electric double layer capacitor 62 become zero after a specified time elapses. The discharge current (shown by a line 306) of the lead battery 16 finally becomes Ib=Eb/(R1+R2+R3) and the load current as shown by a line 308 is supplied to the starter 10. The final voltage Ebs becomes like the line (A) of FIG. 13 taking the internal resistance R3 of the starter assembly 10 into consideration.

Since the voltage Ec of the electric double layer capacitor 62 or the voltage Eb of the lead battery 16 can not measured, for example by detecting the load voltage E1 or the final voltage Ebs the relay switch is shut off.

Figure 14:
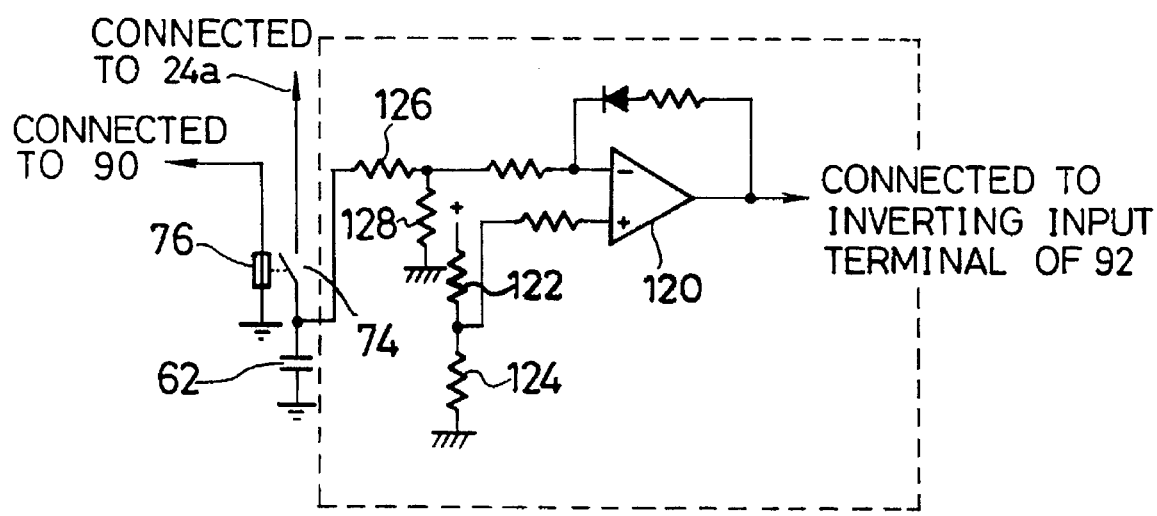
FIG. 14 is a diagram showing a circuit for a relay control according to the present invention.

First, the circuit shown in FIG. 14 is a construction in which the relay switch is controlled by detecting a voltage drop of the electric double layer capacitor 62. Namely, the positive side of the electric double layer capacitor 62 is connected with the inverting input terminal of an operational amplifier 120 through diverting resistances and 128. Further, the final driving voltage of the starter assembly 10 is applied to the non-inverting input terminal of the operational amplifier 120 as a standard voltage through the diverting resistances 122 and 124 and the output of the operational amplifier 120 is connected with the inverting input terminal of the operational amplifier 92 of the circuits shown in FIG. 9 or FIG. 10, whereby the relay switch 74 can be shut off based on the detection of the load voltage E1 and the final voltage Ebs when the current from the electric double layer capacitor 62 becomes zero.

Figure 15:
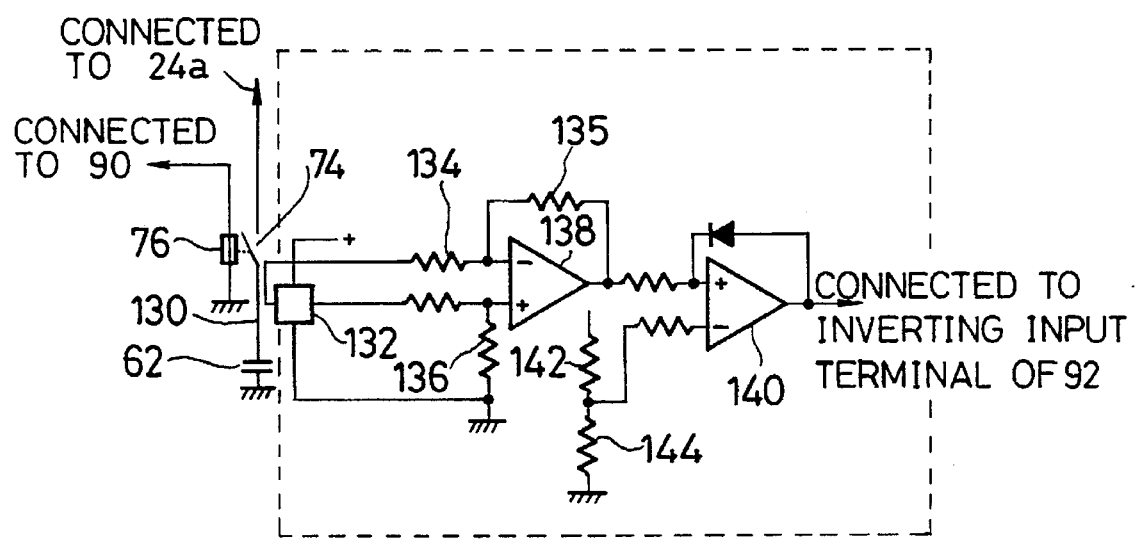
FIG. 15 is a diagram showing a circuit for a relay control according to the present invention.

Next, referring to a circuit shown in FIG. 15, a Hall sensor 132 for detecting current is provided adjacent to the connection line of the electric double layer capacitor 62 and the relay switch 74. The Hall sensor 132 is connected with an operational amplifier (comarator) 138 through an input resistance 134 and a feedback resistance 135 so as to amplify the output of the Hall sensor 132 and to input it to the non-inverting input terminal of an operational amplifier (comparator) 140. On the other hand, a specified standard voltage is inputted to the inverting input terminal of the operational amplifier 140 through diverting resistances 142 and 144. Further, the output of the operational amplifier 140 is connected with the inverting input terminal of the operational amplifier 92 of the circuits shown in FIG. 9 or FIG. 10 in the same way as the circuit in FIG. 14.

When current flows from the electric double layer capacitor 62 to the starter assembly 10 (when discharging), the output of the comparator 138 is at low level and when current flows in a reverse direction, it becomes high level. Further, when the comparison voltage of the comparator 140 is set at a value determined by diverting resistances 142 and 144, the output of the comparator 140 becomes high level at the instant when the output of the comparator 138 becomes high level and this output is inputted to the inverting input terminal of the operational amplifier 92 of the circuit shown in FIG. 9 or FIG. 10, whereby the relay switch 74 is turned off.

In case where the Load generates a counter electromotive force or in case where an impedance varies, since the voltage of the load fluctuates, it happens such a case that the voltage Ec of the electric double layer capacitor 62 becomes smaller than the load voltage E1. At this time, current flows back from the lead battery 16 to the capacitor 62 and the capacitor 62 is charged.

The feature of the embodiment shown in FIG. 15 is to turn the relay switch 74 off by means of detecting an instant when current ic flowing through the electric double layer capacitor 62 becomes zero whenever current direction is changed.

Figure 16:
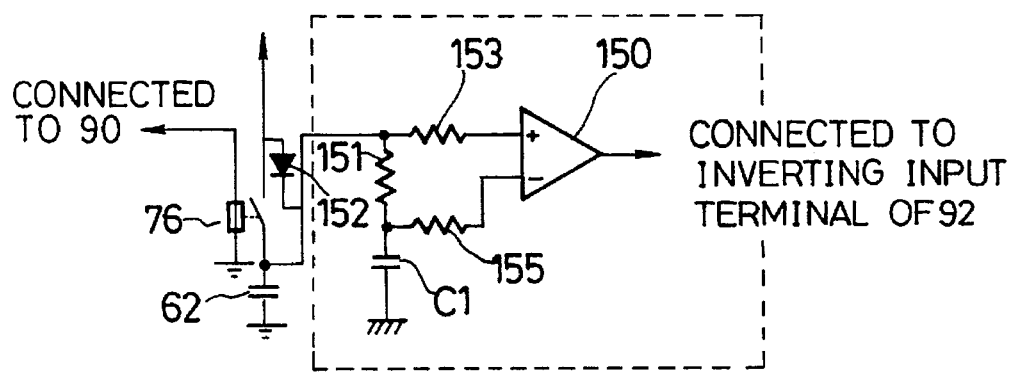
FIG. 16 is a diagram showing a circuit for a relay control according to the present invention.

Referring to a circuit shown in FIG. 16, the electric double layer capacitor 62 is connected at the positive side thereof with the non-inverting input terminal of an operational amplifier 150 through resistances 151 and 153 and the inverting input terminal of the operational amplifier 150 is connected with a capacitor C1 through a resistance 155. Further, the non-inverting input capacitor 150 is serially connected with a diode 152 on the connection line from the positive side of the electric double layer capacitor 62.

This construction is for letting an equivalent model comprising the resistance 155 corresponding to the internal resistance of the electric double layer capacitor 62 and the capacitance C1 corresponding to the capacitance C thereof have an equivalent operation to the electric double layer capacitor 62. For example, if the capacitance of the electric double layer capacitor 62 is 200 F and the internal resistance thereof is 5 mΩ, the capacitance C1 and the resistance 155 are established as 200 μF and 5 MΩ respectively. The voltage of the capacitance C1 which is equivalent to the feeding voltage of the electric double layer capacitor 62 is inputted to the inverting input terminal of the operational amplifier 150. On the other hand, the positive side of the capacitor 62 is connected with the non-inverting input terminal of the operational amplifier 150 to apply the voltage corresponding to the biasing voltage with respect to the internal resistance of the capacitor 62. Consequently, when the electric double layer capacitor 62 is in the discharge condition, i.e., when it is supplying current to the starter assembly 10, the feeding voltage of the capacitor 62 is higher than the voltage of the starter and the output of the operational amplifier 150 is at low level. When the electric double layer capacitor 62 is in the charge condition, the feeding voltage of the capacitor 62 is lower than the voltage of the starter and the output of the operational amplifier 150 is at high level.

If the terminal voltage of the electric double layer capacitor 62 is equal to the feeding voltage thereof, current does not flow to the starter. Then, the output of the operational amplifier 150 becomes high level due to the forward voltage drop of the diode 152 serially connected with the operational amplifier 150 and is inputted to the inverting input terminal of the operational amplifier 92 as shown in FIG. 9 or FIG. 10. Thus, the relay switch 74 can be turned off without being damaged.

The terminal voltage E1 of the electric double layer capacitor 62 is varied according to the variation of the internal resistance R3 of the load. When the terminal voltage E1 becomes higher than the feeding voltage Ec of the capacitor 62, the capacitor 62 is charged. The current flowing to the capacitor 62 is changed from discharge to zero and from zero to charge. Since the capacitor 62 has an internal resistance, the real control based on the feeding voltage can not be realized by using the terminal voltage E1 as a representative value.

Figure 17:
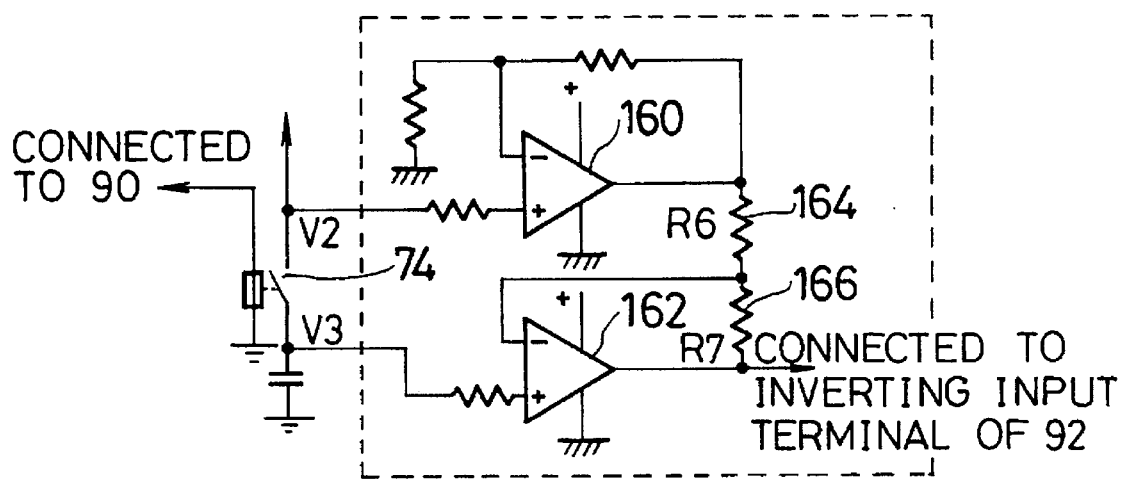
FIG. 17 is a diagram showing a circuit for a relay control according to the present invention.

A circuit shown in FIG. 17 is for solving this problem by utilizing a phenomenon that a sign of the voltage dropped by the contact resistance is converted when current direction is changed.

In this circuit, the both terminals of the relay switch 74 are connected with the non-inverting input terminal of the operational amplifiers 160 and 162 respectively and the inverting input terminal of the operational amplifier 162 is connected with an intermediate line between resistances 164 and 166 which are connected with the output side of the operational amplifiers 160 and 162 respectively.

When the terminal voltages V2 and V3 of the relay switch 74 are inputted to a differential amplifier constituted by the operational amplifiers 160 and 162, the output voltage V0 of the differential amplifier is expressed by $V0 = (1+R7/R6) \cdot (V2-V3)$, letting the resistances 164 and 166 to be R6 and R7 respectively. The output voltage V0 is inputted to the inverting input terminal of the operational amplifier 92 as shown in FIG. 9 or FIG. 10.

Since the discharge is performed from the electric double layer capacitor 62 when the voltage of the capacitor 62 is higher than that of the starter, with respect to the terminal voltages V2 and V3 of the relay switch 74 there is a relationship of V2>V3 and the operational amplifier 162 outputs a signal rendering the output of the operational amplifier 92 at low level. That is, because of this, the relay switch 74 is kept at ON condition. On the other hand, since the voltage of the electrical double Layer capacitor 62 is at charge condition when the voltage thereof is lower than that of the starter and since the relationship between V2 and V3 is V2<V3, the operational amplifier 162 outputs a signal rendering the output of the operational amplifier 92 at high level. Thus, the relay switch 74 is turned off.

After the starter switch 20 is turned on, discharging and charging are performed continuously. The electric double layer capacitor 62 proceeds like discharging, zero current and charging in this order. Since the relay switch 74 is turned off immediately when current is changed from zero to charge, the contact point is never burdened with switching operations.

Figure 18:
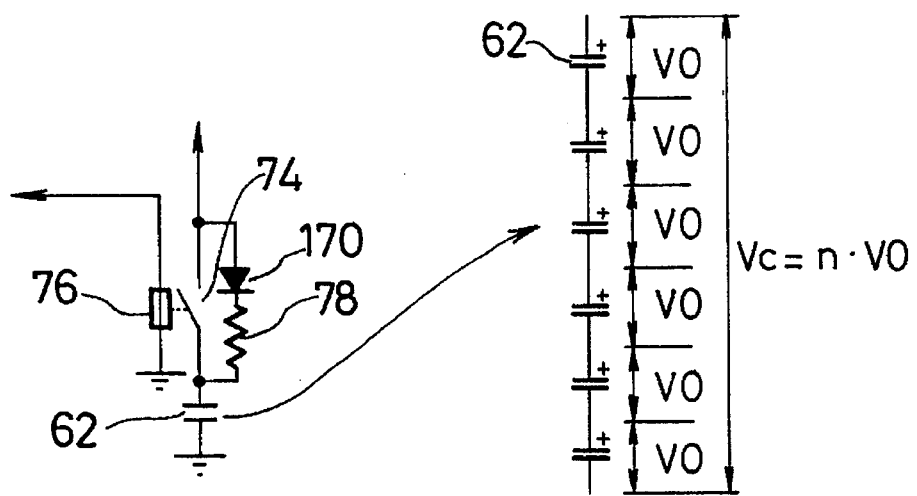
FIG. 18 is a diagram showing a circuit using a plurality of electric double layer capacitors according to the present invention.

There is an upper Limit voltage Vp in the biasing voltage of the electric double layer capacitor 62. The upper limit voltage Vp is equal to a voltage based on an activation energy of the electric double layer capacitor 62. Therefore, if the biasing voltage exceeds this voltage Vp, this incurs an adverse effect on the life of the electric double layer capacitor 62. Generally, in lead batteries for automobiles the biasing voltage Vb varies according to Loads, temperature under which batteries are employed. When the electric double layer capacitor 62 is put into practical use, a plurality of electric double layer capacitors are connected in series with each other as shown in FIG. 18.

Consequently, in the relationship with the upper limit voltage Vp, if n pieces of the electric double layer capacitor 62 are used, it is absolutely necessary to meet the condition Vb≦n.Vp. Since n is integer, if the condition Vb≦n.Vp is not satisfied, at least the condition Vb<(n+1) . Vp must be satisfied. When the number of the capacitor 62 is increased by one, a capacitance C of the combined cell is expressed as C=CO/(n+1) (CO is a capacitance of a unit cell), therefore the capacity of the combined cell becomes smaller than CO/n in a case where n pieces are used. Consequently, since the accumulated energy is proportional to the capacitance, the combined cell of n+1 pieces has a smaller energy than that of n pieces.

FIG. 38 shows a construction having a diode 370 connected in series with the resistor 78. This diode 170 is constituted such that the aforementioned condition Vb<(n+1).Vp is satisfied automatically. That is, since the diode provides a forward voltage drop Vd, the condition Vb<n.Vp +Vd<(n+1).Vp is satisfied. Even if Vb=n.Vp, this diode 170 serves as a fail-safe for a case where the biasing voltage of the lead battery 16 fluctuates.

The voltage of the lead battery 16 fluctuates according to loads, temperature and operating conditions. Especially, when the engine is in standstill, the battery voltage is lower than the battery voltage at the engine operating condition. Further, during the engine operation, the battery voltage becomes low when the battery is not fully charged, or when an electrical load is large, or when the temperature of the engine room is high. The diode 170 also serves for always charging the electric double layer capacitor 62 with a highest voltage while the engine is operative and for preventing the discharge from the capacitor 62 to the lead battery 16.

All the embodiments described before are for reducing a burden on the lead battery in supplying the lock current to the starter when the engine is started by means of the electric double layer capacitor and for improving the startingability of the engine without using any sophisticated control devices.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An engine starting system of a vehicle having an engine, a starter for starting said engine, a battery for supplying a current to said starter, main electrical pass for electrically connecting said battery with said starter, a main switch for selectively opening and closing said main electrical pass and a key switch for operating said main switch, comprising:

a first electrical connection line for electrically connecting said main electrical pass with ground;

a capacitor interposed on said first electrical connection line for storing electricity and when said main switch is opened and for supplying a lock current to said starter when said main switch is closed;

switching means interposed between said capacitor and said main electrical pass for closing said electrical connection line when said key switch is closed and for opening said electrical connection line when said key switch is opened;

a second electrical connection line connected in parallel with said switching means; and, a regulating resistor interposed on said second electrical connection line for regulating current, wherein said key switch comprises a multi-stage switch for closing at least said switching means and said main switch and said multi-stage switch is constituted such that said switching means are closed before said main switch is closed.

2. The engine starting system according to claim 1, wherein
said capacitor comprises at least one electric double layer capacitor.

3. The engine starting system according to claim 1 further comprising:

charging and discharging control means connected in series with said regulating resistor for controlling charging and discharging in said capacitor.

4. An engine starting system for a motor vehicle, comprising:

a starter operable to rotate an engine;

a battery connected to said starter;

a capacitor connected to said starter in parallel to said battery;

a main switch interposed between said starter and both the battery and the capacitor;

a relay provided to allow said capacitor to discharge through said main switch to said starter in a closing state thereof; and manually operated multistage switch means including a first switch interposed between said battery and said relay to close said relay when said first switch is closed and a second switch interposed between said battery and said main switch to close said main switch when said second switch is closed; wherein said second switch is closed after said first switch is closed in order to close said relay prior to closing said main switch.

5. The engine starting system according to claim 4, wherein said first switch is either an ignition switch or an accessory switch of said motor vehicle and said second switch is a starter switch of said motor vehicle.

6. The engine starting system according to claim 4, further comprising:

a relay control circuit interposed between said first switch and said relay for opening said relay to stop said capacitor discharging to said starter when a predetermined time elapses after said second switch is closed.

7. The engine starting system according to claim 4, further comprising;

a relay control circuit interposed between said first switch and said relay for opening said relay to stop said capacitor discharging to said starter when said engine reaches a predetermined engine speed after said second switch is closed.

8. The engine starting system according to claim 4, further comprising:

a relay control circuit interposed between said first switch and said relay for opening said relay to stop said capacitor discharging to said starter when a discharge voltage of said capacitor drops below a predetermined value after said second switch is closed.

9. The engine starting system according to claim 8, wherein said relay control circuit is connected to said capacitor to detect a discharge voltage of said capacitor whereby when the detected discharge voltage drops below said predetermined value as a final voltage of said capacitor, it is determined that a discharge current from said capacitor drops to approximately zero.

10. The engine starting system according to claim 4, further comprising:

a relay control circuit interposed between said first switch and said relay for opening said relay to stop said capacitor discharging to said starter when a discharge current from said capacitor drops to approximately zero after said second switch is closed.

11. The engine starting system according to claim 10, wherein said relay control circuit includes a Hall sensor for detecting a change of the direction of current flowing through said capacitor whereby when the change of the current direction is detected by said Hall sensor, it is determined that a discharge current from said capacitor drops to approximately zero.

12. The engine starting system according to claim 4, further comprising:

a relay control circuit interposed between said first switch and said relay for opening said relay to stop said capacitor discharging to said starter when it is determined that a discharge current becomes almost zero, by using a model equivalent to the characteristics of said capacitor.

13. The engine starting system according to claim 4, further comprising:

a relay control circuit interposed between said first switch and said relay for opening said relay to stop said capacitor discharging to said starter when it is determined that a direction of flowing current through said relay changes, depending on terminal voltages of said relay.

14. The engine starting system according to claim 4, further comprising:

a resistor provided parallel to said relay for charging said capacitor with said battery when said relay is opened; and a diode connected in series with said resistor to prevent said capacitor from discharging through said resistor to said battery.

* * * * *